United States Patent
Wang

(10) Patent No.: US 10,415,604 B2
(45) Date of Patent: Sep. 17, 2019

(54) PUMPING DEVICE FOR SUCKING OR DRAINING FLUID

(71) Applicant: Crafts & Carriers Taiwan Inc., Tainan (TW)

(72) Inventor: Kun-Wang Wang, Tainan (TW)

(73) Assignee: Crafts & Carriers Taiwan Inc., Tainan (TW)

(*) Notice: Subject to any disclaimer, the term of this patent is extended or adjusted under 35 U.S.C. 154(b) by 144 days.

(21) Appl. No.: 15/381,505

(22) Filed: Dec. 16, 2016

(65) Prior Publication Data

US 2017/0097018 A1 Apr. 6, 2017

Related U.S. Application Data

(63) Continuation-in-part of application No. 13/798,443, filed on Mar. 13, 2013, now abandoned.

(51) Int. Cl.
| | |
|---|---|
| *F04F 5/14* | (2006.01) |
| *F04F 5/52* | (2006.01) |
| *F04F 5/20* | (2006.01) |
| *B05B 7/24* | (2006.01) |
| *F16K 5/02* | (2006.01) |
| *F04B 33/00* | (2006.01) |

(52) U.S. Cl.
CPC .............. *F04F 5/14* (2013.01); *B05B 7/2424* (2013.01); *F04B 33/00* (2013.01); *F04F 5/20* (2013.01); *F04F 5/52* (2013.01); *F16K 5/0221* (2013.01); *Y10T 137/85978* (2015.04)

(58) Field of Classification Search
CPC ........ F04F 5/00; F04F 5/14; F04F 5/16; F04F 5/24; F04F 5/48; F04F 1/02; F04F 1/06; F04F 3/00; F04F 5/20; F04F 5/52; F04B 9/14; F04B 33/00; F16K 1/14; F16K 5/0221; B05B 7/2424; Y10T 137/85978

USPC .......... 417/40, 41, 86, 118, 187, 199.1, 374; 137/205

See application file for complete search history.

(56) References Cited

U.S. PATENT DOCUMENTS

| | | | |
|---|---|---|---|
| 1,986,476 A * | 1/1935 | Ironside | .................. B60R 17/00 134/167 R |
| 3,494,514 A | 2/1970 | Johnston | |
| 6,412,669 B1 * | 7/2002 | Chuang | .................. B05B 7/2421 137/205 |
| 6,763,847 B2 | 7/2004 | Jou | |
| 8,360,741 B2 * | 1/2013 | Chuang | ..................... F04B 9/14 417/185 |
| 2012/0134852 A1 | 5/2012 | Chuang | |

* cited by examiner

*Primary Examiner* — Alexander B Comley
*Assistant Examiner* — Chirag Jariwala
(74) *Attorney, Agent, or Firm* — Alan D. Kamrath; Mayer & Williams PC

(57) ABSTRACT

A pumping device includes a seal cap unit including a cap, an air relief member connected with the cap, and a regulating member connected with the air relief member. The cap has an air inlet hole and an air outlet hole. The air outlet hole has a through hole. The air relief member is mounted on the air outlet hole and has a guide hole and a plurality of apertures. The regulating member has an air relief hole and a plurality of draining holes. Thus, the air relief hole of the regulating member and the pressure relief member provide a double pressure relief function to release the excessive air pressure in the barrel.

10 Claims, 8 Drawing Sheets

PUMPING DEVICE FOR SUCKING OR DRAINING FLUID

CROSS-REFERENCES TO RELATED APPLICATIONS

The present invention is a continuation-in-part (C.I.P.) application of the co-pending U.S. Ser. No. 13/798,443, filed on Mar. 13, 2013.

BACKGROUND OF THE INVENTION

1. Field of the Invention

The present invention relates to a pumping device and, more particularly, to a pumping device for pumping a fluid, including gas and liquid.

2. Description of the Related Art

A pumping device is used to draw a fluid in an external container into a barrel, or to press the fluid in the barrel outward into the external container. The pumping device comprises a pressure relief member mounted on and connected to the barrel to release a portion of the air pressure in the barrel when the air pressure in the barrel exceeds a preset value so as to assure a safe operation of the barrel. However, the air pressure in the barrel cannot be drained outward from the barrel when the pressure relief member fails or malfunctions so that the barrel is easily deformed or broken due to an excessive air pressure in the barrel, thereby causing danger to the user.

A conventional pumping device disclosed in U.S. publication No. 2012/0134852 comprises a ball-shaped blocking body 34 directly received in and abutting a small-diameter section 3533 as shown in FIGS. 5 and 6. Thus, the air is only allowed to bypass to the micro-hole 355 or the exhaustion space 32 and is then introduced outward from the exhaustion portion 313. The ball-shaped blocking body 34 directly abuts the small-diameter section 3533 instead of the outlet end 23. In addition, after the air enters the micro-section 35, the air has to bypass to be drained outward, thereby decreasing the air exhaust effect.

Another conventional pumping device disclosed in U.S. Pat. No. 6,412,669 comprises a movable member 45 having a tapered tip 451 to stop and prevent the air in the air inlet 24 from flowing outward as shown in FIGS. 7 and 8. After the movable member 45 is loosened, the air has to bypass to be introduced outward from the slot 44. However, after the air enters the movable member 45, the air has to bypass to be introduced outward, thereby decreasing the air exhaust effect. In addition, the movable member 45 does not have a hole for draining the air. Further, such a conventional pumping device cannot drain the air successively in a small quantity manner to release the pressure in the barrel gradually, so that the conventional pumping device does not provide a double pressure relief function to release the excessive air pressure in the barrel.

Another conventional pumping device disclosed in U.S. Pat. No. 3,494,514 only comprises a check valve structure and does not have a pressure barrel with a drawing or sucking function. In addition, such a conventional pumping device does not have an air draining function.

BRIEF SUMMARY OF THE INVENTION

The primary objective of the present invention is to provide a pumping device for sucking or draining a fluid in a rotational regulating pressure manner.

In accordance with the present invention, there is provided a pumping device, comprising a seal cap unit including a cap, an air relief member connected with the cap, and a regulating member connected with the air relief member. The cap of the seal cap unit has a first end provided with an air inlet hole and a second end provided with an air outlet hole. The air outlet hole of the cap has a periphery provided with a through hole. The through hole of the cap is extended through a bottom of the cap. The air relief member has a first end mounted in the air outlet hole of the cap and a second end protruding outward from the air outlet hole of the cap. The air relief member has an interior provided with a guide hole. The guide hole of the air relief member has a periphery provided with a plurality of apertures. The apertures of the air relief member are arranged in a radiating manner. The regulating member of the seal cap unit is screwed onto the second end of the air relief member. The regulating member of the seal cap unit has a central position provided with an air relief hole connected to the guide hole of the air relief member. The regulating member of the seal cap unit has a periphery provided with a plurality of draining holes to introduce and drain air in the regulating member. Each of draining holes has a diameter greater than that of the air relief hole. The guide hole of the air relief member has a front end provided with a tapered groove. The regulating member has an inner side provided with a tapered projection located between the air relief hole and the draining holes. When the regulating member is combined with the second end of the air relief member, the air relief hole is aligned with and connected to the guide hole of the air relief member. When the regulating member is locked onto the second end of the air relief member, the tapered projection of the regulating member closely presses the tapered groove of the air relief member.

Preferably, the air inlet hole of the cap is connected to the air outlet hole of the cap.

Preferably, the through hole of the cap is connected to the apertures of the air relief member.

Preferably, the seal cap unit further includes a check valve mounted in the through hole of the cap and located between the through hole of the cap and the pressure barrel unit.

Preferably, the seal cap unit further includes an air collection tube mounted in the air outlet hole of the cap and connected between the air inlet hole of the cap and the guide hole of the air relief member. The air collection tube is located between the air relief member and the cap.

According to the primary advantage of the present invention, the regulating member regulates the air flow of the air relief member to change and regulate the air pressure in the barrel so that fluid in an external container can be drawn into the barrel, and the fluid in the barrel can be compressed into the external container.

According to another advantage of the present invention, the air relief hole of the regulating member and the pressure relief member provide a double pressure relief function to release the excessive air pressure in the barrel so as to assure a safe operation of the pumping device.

According to a further advantage of the present invention, the air in the barrel is drained outward from the air relief hole of the regulating member when the air pressure in the barrel is increased to exceed a preset value, so that the air relief hole of the regulating member provides a further pressure relief function to release the air pressure in the barrel when the pressure relief member fails or malfunctions so as to prevent the barrel from being deformed or broken due to an excessive air pressure in the barrel.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
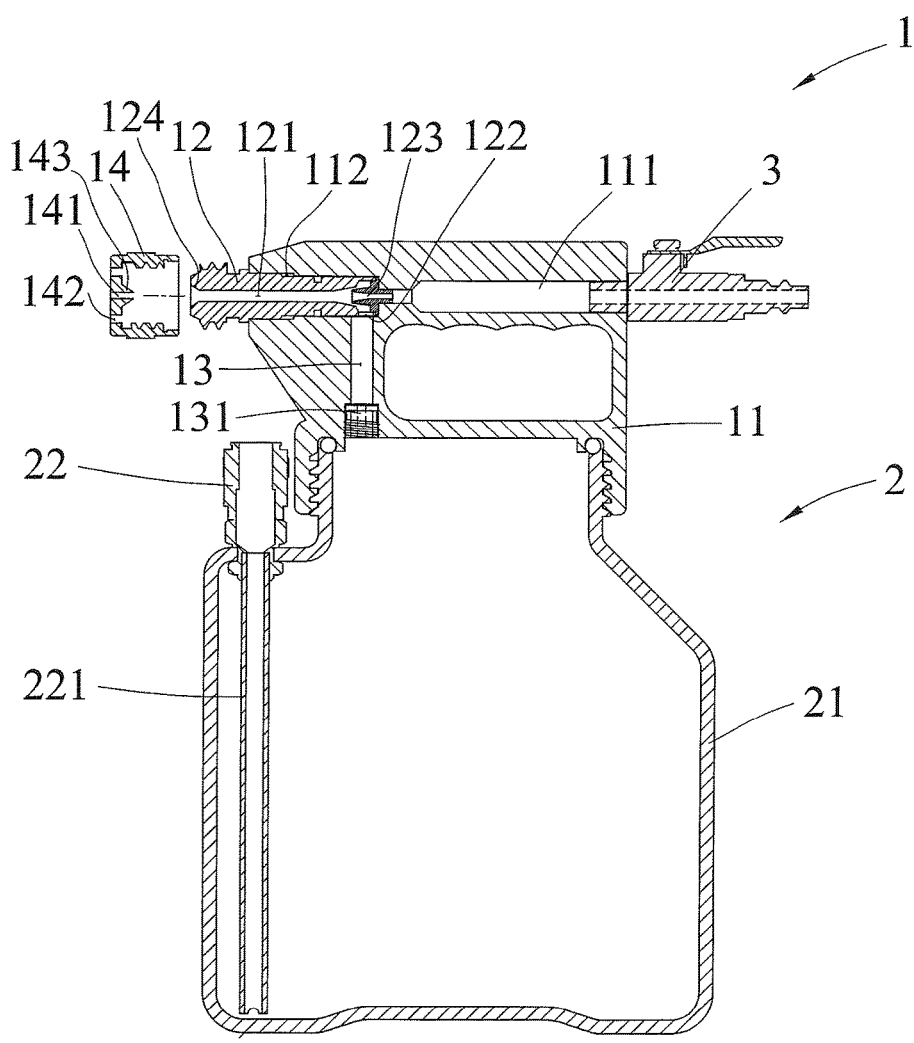
FIG. 1 is a partially front exploded cross-sectional view of a pumping device in accordance with the preferred embodiment of the present invention.
Figure 2:
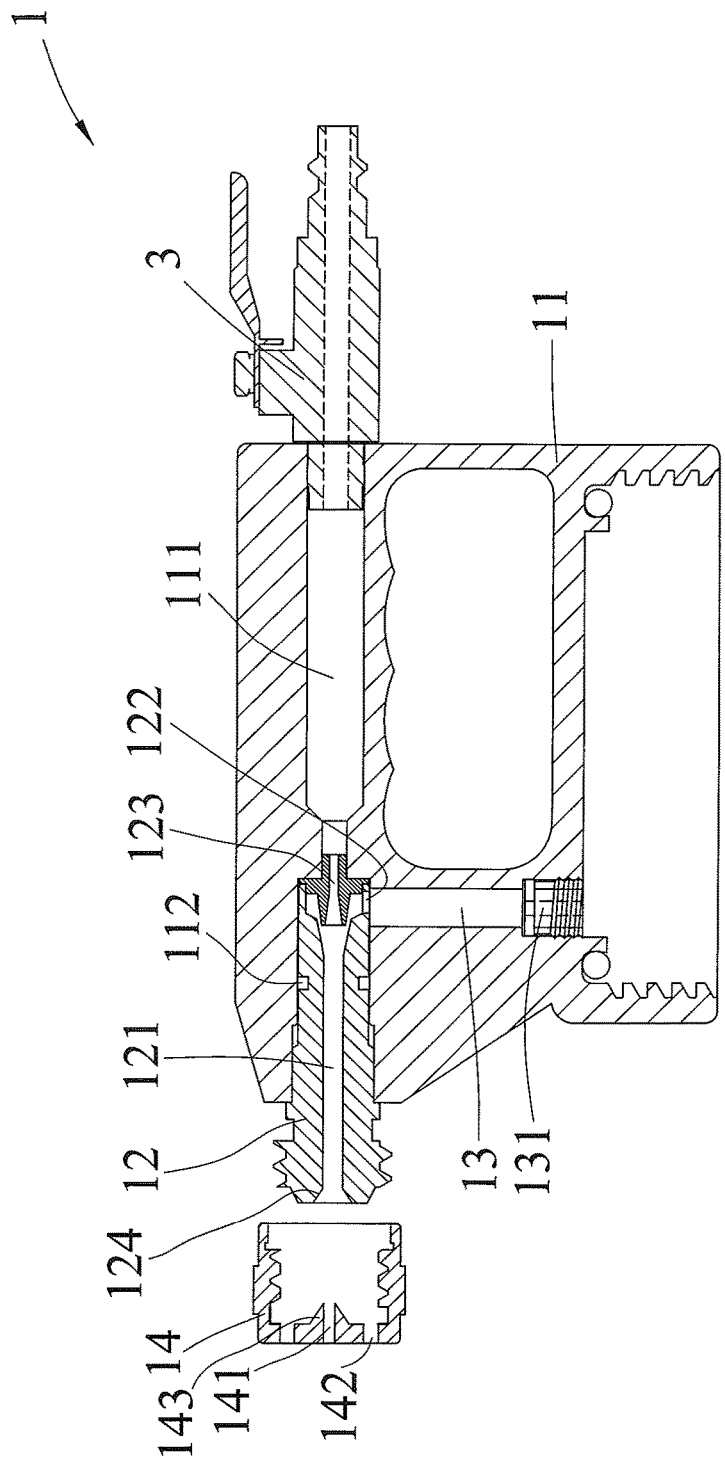
FIG. 2 is a locally enlarged view of the pumping device as shown in FIG. 1.
Figure 3:
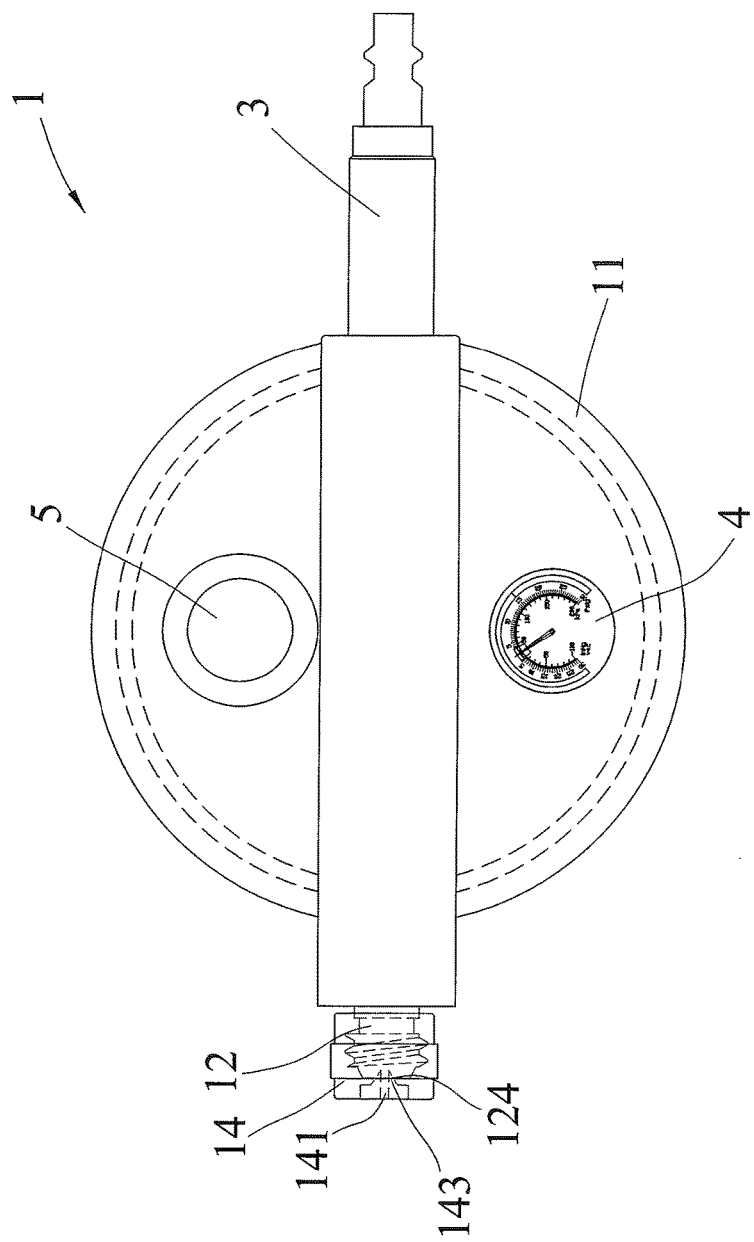
FIG. 3 is a top view of the pumping device in accordance with the preferred embodiment of the present invention.
Figure 4:
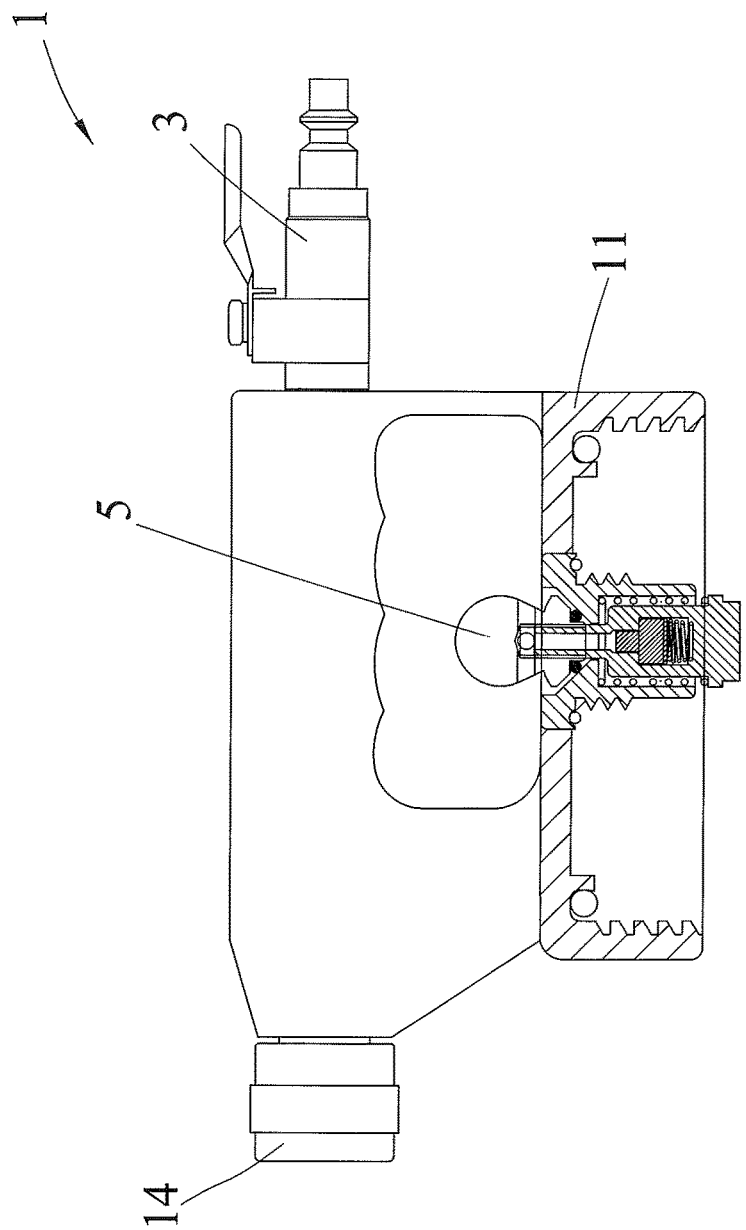
FIG. 4 is another partially front cross-sectional view of the pumping device in accordance with the preferred embodiment of the present invention.

Referring to the drawings and initially to FIGS. 1-4, a pumping device in accordance with the preferred embodiment of the present invention comprises a seal cap unit 1 and a pressure barrel unit 2 combined with the seal cap unit 1.

The seal cap unit 1 includes a cap 11, an air relief member 12 connected with the cap 11, and a regulating member 14 connected with the air relief member 12.

The cap 11 of the seal cap unit 1 has a first end provided with an air inlet hole 111 and a second end provided with an air outlet hole 112. The air inlet hole 111 of the cap 11 is connected to the air outlet hole 112 of the cap 11. The air outlet hole 112 of the cap 11 has a periphery provided with a through hole 13. The through hole 13 of the cap 11 is extended through a bottom of the cap 11. The seal cap unit 1 further includes a check valve 131 mounted in the through hole 13 of the cap 11 and located between the through hole 13 of the cap 11 and the pressure barrel unit 2 to prevent air in the pressure barrel unit 2 from being largely returned to the through hole 13 of the cap 11.

The pumping device further comprises an air inlet switch 3 mounted on the cap 11 of the seal cap unit 1 and connected to the air inlet hole 111 of the cap 11 to control the air intake flow of the air inlet hole 111 of the cap 11.

The air relief member 12 has a first end mounted in the air outlet hole 112 of the cap 11 and a second end protruding outward from the air outlet hole 112 of the cap 11. The air relief member 12 has an interior provided with a guide hole 121. The guide hole 121 of the air relief member 12 has a periphery provided with a plurality of apertures 122. The apertures 122 of the air relief member 12 are arranged in a radiating manner and are connected to the guide hole 121. The through hole 13 of the cap 11 is connected to the apertures 122 of the air relief member 12.

The seal cap unit 1 further includes an air collection tube 123 mounted in the air outlet hole 112 of the cap 11 and connected between the air inlet hole 111 of the cap 11 and the guide hole 121 of the air relief member 12 to introduce air from the air inlet hole 111 of the cap 11 into the guide hole 121 of the air relief member 12. The air collection tube 123 is located between the air relief member 12 and the cap 11.

The regulating member 14 of the seal cap unit 1 is screwed onto the second end of the air relief member 12. The regulating member 14 of the seal cap unit 1 has a central position provided with an air relief hole 141 connected to and in line with the guide hole 121 of the air relief member 12. The regulating member 14 of the seal cap unit 1 has a periphery provided with a plurality of draining holes 142 to introduce and drain air in the regulating member 14. Each of draining holes 142 has a diameter greater than that of the air relief hole 141.

The pressure barrel unit 2 includes a barrel 21, a delivery pipe 221 mounted in the barrel 21, and a quick connector 22 mounted on the barrel 21 and connected to the delivery pipe 221. The barrel 21 of the pressure barrel unit 2 has a threaded open top screwed into a threaded lower portion of the cap 11. The barrel 21 of the pressure barrel unit 2 is connected to the through hole 13 of the cap 11 through the check valve 131. The delivery pipe 221 of the pressure barrel unit 2 is extended downward to the bottom of the barrel 21.

The pumping device further comprises a pressure gauge 4 mounted on the cap 11 of the seal cap unit 1 and connected to the barrel 21 of the pressure barrel unit 2 to detect and measure the air pressure in the barrel 21 of the pressure barrel unit 2, and a pressure relief member 5 mounted on the cap 11 of the seal cap unit 1 and connected to the barrel 21 of the pressure barrel unit 2 to release a portion of the air pressure in the barrel 21 of the pressure barrel unit 2 when the air pressure in the barrel 21 of the pressure barrel unit 2 exceeds a preset value.

In the preferred embodiment of the present invention, the guide hole 121 of the air relief member 12 has a front end provided with a tapered groove 124. The regulating member 14 has an inner side provided with a tapered projection 143 located between the air relief hole 141 and the draining holes 142. When the regulating member 14 is combined with the second end of the air relief member 12, the air relief hole 141 is aligned with and connected to the guide hole 121 of the air relief member 12. When the regulating member 14 is locked onto the second end of the air relief member 12, the tapered projection 143 of the regulating member 14 closely presses the tapered groove 124 of the air relief member 12.

In operation, referring to FIGS. 5-8 with reference to FIGS. 1-4, the air inlet switch 3 is connected with an air inlet pipe 31 so that air in the air inlet pipe 31 is introduced into the air inlet hole 111 of the cap 11 of the seal cap unit 1. The quick connector 22 of the pressure barrel unit 2 is connected with a connecting pipe 6 so that the connecting pipe 6 is connected to the delivery pipe 221 of the pressure barrel unit 2. The connecting pipe 6 is connected with a container which contains a fluid (gas or liquid).

Figure 5:
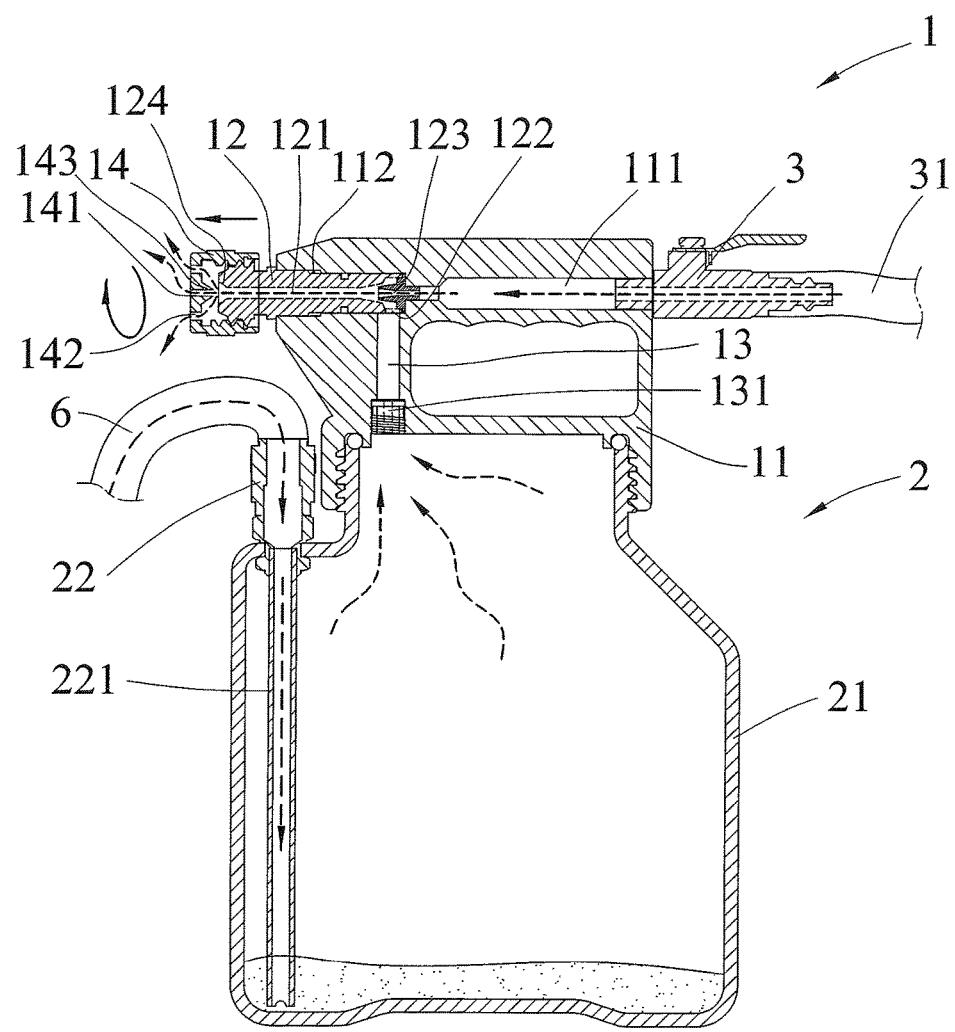
FIG. 5 is a schematic operational view of the pumping device as shown in FIG. 1.
Figure 6:
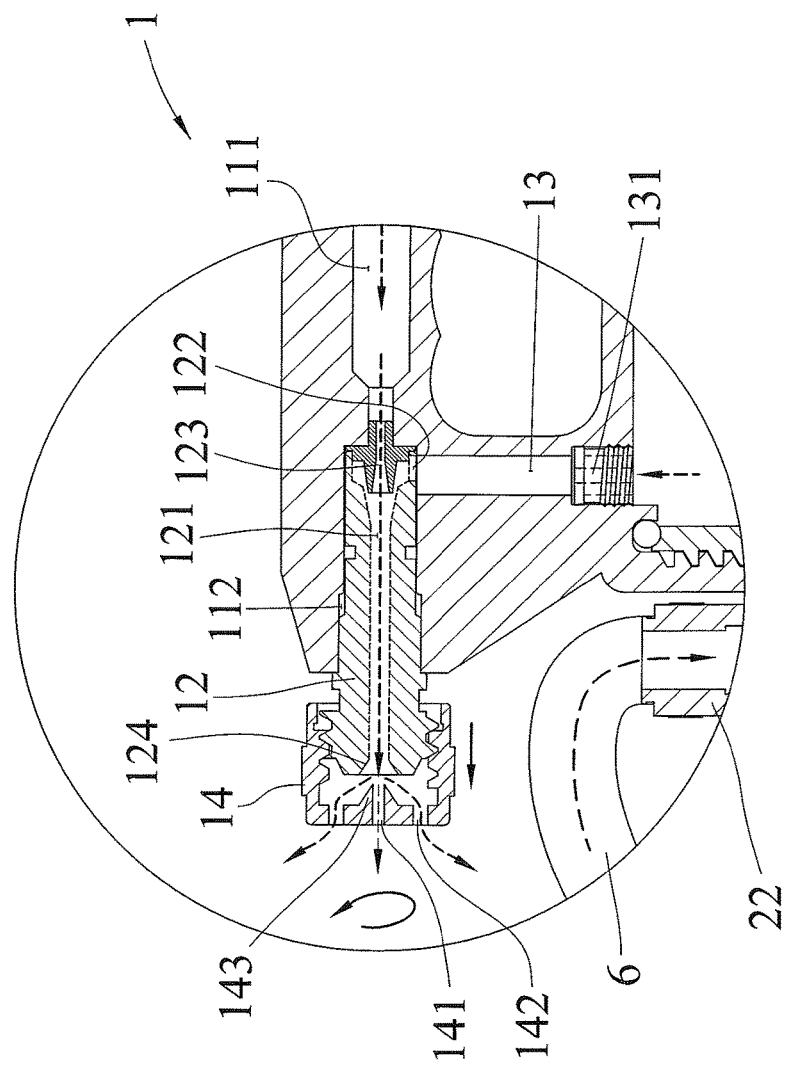
FIG. 6 is a locally enlarged view of the pumping device as shown in FIG. 5.

When a user wishes to suck the fluid from the container into the barrel 21 of the pressure barrel unit 2 as shown in FIGS. 5 and 6, the regulating member 14 of the seal cap unit 1 is unscrewed and loosened from the second end of the air relief member 12 to connect the guide hole 121 of the air relief member 12 to the draining holes 142 of the regulating member 14. Then, the air inlet switch 3 is opened so that the air in the air inlet pipe 31 in turn flows through the air inlet hole 111 of the cap 11, the air collection tube 123 and the guide hole 121 of the air relief member 12 into the regulating member 14, and is drained outward from the air relief hole 141 and the draining holes 142 of the regulating member 14. At this time, a large amount of the air is guided smoothly by the tapered projection 143 of the regulating member 14 toward the draining holes 142 and is drained outward from the draining holes 142 of the regulating member 14, and a small amount of the air is directly drained outward from the air relief hole 141 of the regulating member 14. In such a manner, the air is accelerated to pass through the guide hole 121 of the air relief member 12 so that the air pressure in the guide hole 121 of the air relief member 12 is smaller than that of the barrel 21 of the pressure barrel unit 2. Therefore, the air in the barrel 21 is drawn through the through hole 13 of the cap 11 and the apertures 122 of the air relief member 12 into the guide hole 121 of the air relief member 12 by the pressure differential between the guide hole 121 of the air relief member 12 and the barrel 21, and is then drained outward to the ambient environment from the air relief hole 141 and the draining holes 142 of the regulating member 14. Thus, the air is drained outward from the barrel 21 successively so that the barrel 21 is evacuated to produce a vacuum suction force. In such a manner, the fluid in the container is drawn by the vacuum suction force from the barrel 21, and is delivered through the connecting pipe 6, the quick connector 22 and the delivery pipe 221 into the barrel 21 successively.

Figure 7:
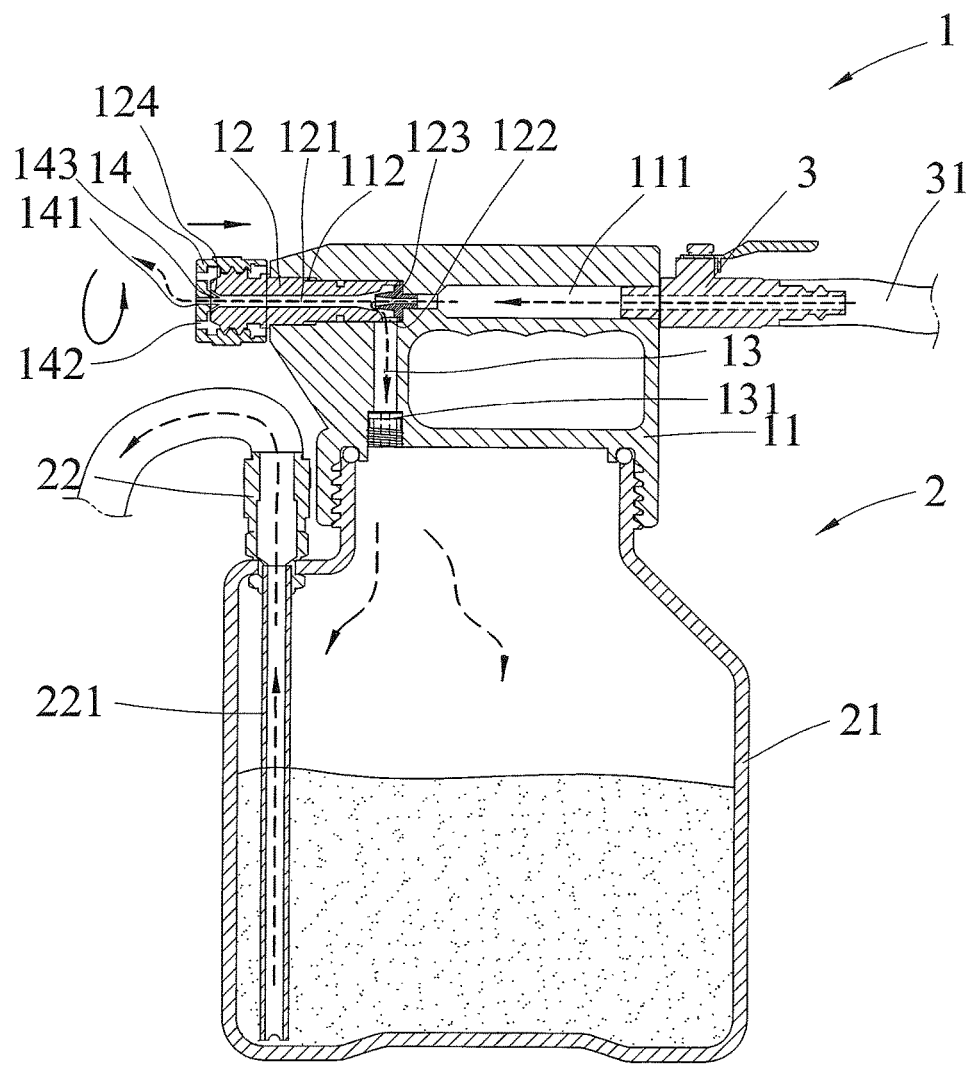
FIG. 7 is another schematic operational view of the pumping device as shown in FIG. 1.
Figure 8:
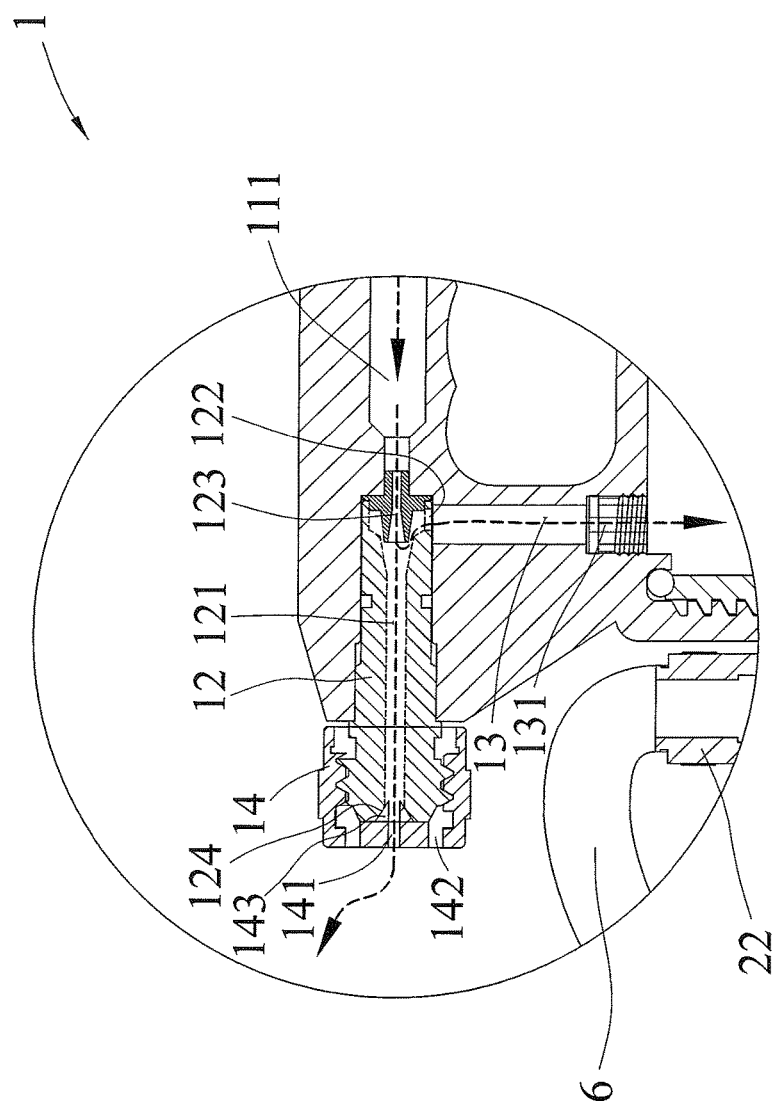
FIG. 8 is a locally enlarged view of the pumping device as shown in FIG. 7.

On the contrary, when the user wishes to drain the fluid from the barrel 21 into the container as shown in FIGS. 7 and 8, the regulating member 14 of the seal cap unit 1 is screwed and locked onto the second end of the air relief member 12, and the tapered projection 143 of the regulating member 14 closely presses the tapered groove 124 of the air relief member 12, to interrupt the connection between the guide hole 121 of the air relief member 12 and the draining holes 142 of the regulating member 14, so that the air in the guide hole 121 of the air relief member 12 can only pass through the air relief hole 141 of the regulating member 14. Then, the air inlet switch 3 is opened so that the air in the air inlet pipe 31 in turn flows through the air inlet hole 111 of the cap 11, the air collection tube 123 and the guide hole 121 of the air relief member 12 into the regulating member 14, and is drained outward from the air relief hole 141 of the regulating member 14. At this time, when a large portion of the air cannot be drained outward from the air relief hole 141 of the regulating member 14, the large portion of the air is forced to pass through the apertures 122 of the air relief member 12 and the through hole 13 of the cap 11 into the barrel 21 to gradually increase the air pressure in the barrel 21. In such a manner, the fluid in the barrel 21 is compressed downward by the gradually increasing air pressure in the barrel 21 and is forced to flow through the delivery pipe 221, the quick connector 22 and the connecting pipe 6 into the container. It is appreciated that, when the air pressure in the barrel 21 is increased to exceed a preset value, the air in the barrel 21 is drained outward from the air relief hole 141 of the regulating member 14, so that the air relief hole 141 of the regulating member 14 provides a further pressure relief function to release the air pressure in the barrel 21 when the pressure relief member 5 fails or malfunctions so as to prevent the barrel 21 from being deformed or broken due to an excessive air pressure in the barrel 21.

Accordingly, the air relief hole 141 of the regulating member 14 and the pressure relief member 5 provide a double pressure relief function to release the excessive air pressure in the barrel 21 so as to assure a safe operation of the pumping device. In addition, the air in the barrel 21 is drained outward from the air relief hole 141 of the regulating member 14 when the air pressure in the barrel 21 is increased to exceed a preset value, so that the air relief hole 141 of the regulating member 14 provides a further pressure relief function to release the air pressure in the barrel 21 when the pressure relief member 5 fails or malfunctions so as to prevent the barrel 21 from being deformed or broken due to an excessive air pressure in the barrel 21. Further, the regulating member 14 regulates the air flow of the air relief member 12 to change and regulate the air pressure in the barrel 21 so that fluid in an external container can be drawn into the barrel 21, and the fluid in the barrel 21 can be compressed into the external container.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A pumping device, comprising:
a seal cap unit including:
a cap;
an air relief member connected with the cap; and
a regulating member removably connected with the air relief member;
wherein:
the cap of the seal cap unit has a first end provided with an air inlet hole and a second end provided with an air outlet hole;
the air outlet hole of the cap has a periphery provided with a through hole;
the through hole of the cap is extended through a bottom of the cap;
the air relief member has a first end mounted in the air outlet hole of the cap and a second end protruding outward from the air outlet hole of the cap;
the air relief member has an interior provided with a guide hole;
the guide hole of the air relief member has a periphery provided with a plurality of apertures;
the apertures of the air relief member are arranged in a radiating manner;
the regulating member of the seal cap unit is an integral structure;
the regulating member of the seal cap unit is screwed onto the second end of the air relief member;
the regulating member of the seal cap unit has a central position provided with an air relief hole connected to the guide hole of the air relief member;
the regulating member of the seal cap unit has a periphery provided with a plurality of draining holes to introduce and drain air in the regulating member;
each of draining holes has a diameter greater than that of the air relief hole;
the guide hole of the air relief member has a front end provided with a tapered groove;
the regulating member has an inner side provided with a tapered projection located between the air relief hole and the draining holes;
when the regulating member is mounted on the second end of the air relief member, the air relief hole is aligned with and connected to the guide hole of the air relief member;
when the regulating member is locked onto the second end of the air relief member, the tapered projection of the regulating member extends into and closely presses the tapered groove of the air relief member; and
when the tapered projection of the regulating member presses the tapered groove of the air relief member, the draining holes of the regulating member are closed by the air relief member, and the air relief hole of the regulating member is open and connected to the guide hole of the air relief member.

2. The pumping device of claim 1, wherein the air inlet hole of the cap is connected to the air outlet hole of the cap.

3. The pumping device of claim 1, wherein the through hole of the cap is connected to the apertures of the air relief member.

4. The pumping device of claim 1, wherein the seal cap unit further includes a check valve mounted in the through hole of the cap.

5. The pumping device of claim 1, wherein:
the seal cap unit further includes an air collection tube mounted in the air outlet hole of the cap and connected between the air inlet hole of the cap and the guide hole of the air relief member; and
the air collection tube is located between the air relief member and the cap.

6. The pumping device of claim 1, wherein the air relief hole of the regulating member is disposed at an open state constantly when the regulating member is mounted on the second end of the air relief member and when the regulating member is locked onto the second end of the air relief member.

7. The pumping device of claim 1, wherein the draining holes of the regulating member surround the air relief hole.

8. The pumping device of claim 1, wherein the tapered projection of the regulating member surrounds the air relief hole.

9. The pumping device of claim 1, wherein the air in the regulating member is guided by the tapered projection to the draining holes of the regulating member.

10. The pumping device of claim 1, wherein when the regulating member is mounted on the second end of the air relief member, the tapered projection of the regulating member is located between the guide hole of the air relief member and the draining holes of the regulating member.

\* \* \* \* \*